United States Patent
Bogdan et al.

(10) Patent No.: US 11,436,258 B2
(45) Date of Patent: Sep. 6, 2022

(54) PROMETHEUS: PROCESSING-IN-MEMORY HETEROGENOUS ARCHITECTURE DESIGN FROM A MULTI-LAYER NETWORK THEORETIC STRATEGY

(71) Applicant: UNIVERSITY OF SOUTHERN CALIFORNIA, Los Angeles, CA (US)

(72) Inventors: Paul Bogdan Bogdan, Los Angeles, CA (US); Shahin Nazarian, Los Angeles, CA (US); Yao Xiao, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 780 days.

(21) Appl. No.: 16/408,714

(22) Filed: May 10, 2019

(65) Prior Publication Data

US 2019/0370269 A1 Dec. 5, 2019

Related U.S. Application Data

(60) Provisional application No. 62/644,428, filed on Mar. 17, 2018.

(51) Int. Cl.
| | |
|---|---|
| *G06F 16/28* | (2019.01) |
| *G06F 9/50* | (2006.01) |
| *G06F 8/35* | (2018.01) |
| *G06F 12/02* | (2006.01) |

(52) U.S. Cl.
CPC ............ *G06F 16/283* (2019.01); *G06F 8/35* (2013.01); *G06F 9/5077* (2013.01); *G06F 12/0207* (2013.01); *G06F 2212/1048* (2013.01)

(58) Field of Classification Search
CPC ......... G06F 16/283; G06F 9/5077; G06F 8/35
See application file for complete search history.

(56) References Cited

U.S. PATENT DOCUMENTS

| | | | | |
|---|---|---|---|---|
| 7,143,163 | B1* | 11/2006 | Bleichenbacher | H04L 63/10 713/168 |
| 8,863,096 | B1* | 10/2014 | Bucur | G06F 11/3604 717/124 |
| 9,813,080 | B1* | 11/2017 | Micheloni | H03M 13/112 |
| 10,230,396 | B1* | 3/2019 | Micheloni | G06F 11/1048 |
| 2011/0122137 | A1* | 5/2011 | Wang | G11B 27/322 704/10 |
| 2013/0326625 | A1* | 12/2013 | Anderson | G06F 21/56 726/23 |

(Continued)

OTHER PUBLICATIONS

Xue, Y. et al., "Scalable and Realistic Benchmark Synthesis for Efficient NoC Performance Evaluation: A Complex Network Analysis Approach," CODES/ISSS, Oct. 1-7, 2016, 10 pgs.

(Continued)

*Primary Examiner* — Eliyah S. Harper
(74) *Attorney, Agent, or Firm* — Brooks Kushman P.C.

(57) ABSTRACT

With increasing demand for distributed intelligent physical systems performing big data analytics on the field and in real-time, processing-in-memory (PIM) architectures integrating 3D-stacked memory and logic layers could provide higher performance and energy efficiency. Towards this end, the PIM design requires principled and rigorous optimization strategies to identify interactions and manage data movement across different vaults.

37 Claims, 9 Drawing Sheets

(56) References Cited

U.S. PATENT DOCUMENTS

| | | | |
|---|---|---|---|
| 2017/0083434 A1* | 3/2017 | Potash | G06F 9/00 |
| 2017/0083449 A1* | 3/2017 | Potash | G06F 9/3824 |
| 2018/0322606 A1* | 11/2018 | Das | G06T 1/20 |

OTHER PUBLICATIONS

Xiao, Y. et al., "A Load Balancing Inspired Optimization Framework for Exascale Multicore Systems: A Complex Network Approach," IEEE ©2017, 8 pgs.

Xiao, Y. et al., "Prometheus: Processing-in-memory Heterogeneous Architecture Design From a Multi-layer Network Theoretic Strategy," Design, Automation and Test in Europe, 2018, pp. 1387-1392.

* cited by examiner

PROMETHEUS: PROCESSING-IN-MEMORY HETEROGENOUS ARCHITECTURE DESIGN FROM A MULTI-LAYER NETWORK THEORETIC STRATEGY

CROSS REFERENCE

This application claims the benefit of U.S. provisional application Ser. No. 62/644,428 filed Mar. 17, 2018, the disclosure of which is incorporated in its entirety by reference herein.

STATEMENT REGARDING FEDERALLY SPONSORED RESEARCH OR DEVELOPMENT

The invention was made with Government support under Contract Nos. W911NF-17-1-0076 and N66001-17-1-4044 awarded by the U.S. Army Defense Advanced Research Projects Agency, and Contract No. CPS1453860 awarded by the National Science Foundation. The Government has certain rights to the invention.

TECHNICAL FIELD

In at least one aspect, the present invention is related to methods for mapping a computer program to a plurality of memory layers.

BACKGROUND

The era of big data enables programmers to write memory intensive applications. However, traditional systems are unable to handle big volume of data with fast response as they are designed to execute computations. Therefore, once last level cache miss is generated, data has to be fetched from the main memory via off-chip links. Memory bandwidth becomes a bottleneck for those applications. One technique to address this issue is to bring processing units close to main memory [8]. This was proposed a decade ago, but never succeeded due to design complexity. Nowadays, processing-in-memory (PIM) regains its popularity because 3D-stacking technologies allow memory layers stacked upon each other and connected via TSVs (through-silicon vias). The hybrid memory cube (HMC) provided by Micro [6] is an example of the commercial PIM systems. As shown in FIG. 1, according to HMC 2.1 specification, inside one cube, there are eight memory layers and one logic layer stacked on top of each other with 32 partitions, which are also called vaults.

However, there are two key challenges required to be addressed to exploit the benefits of PIM systems: (1) Where should data reside among different vaults to reduce data movement and utilize internal memory bandwidth? Ahn et al. [1] reported that performing 512-way multi-constraint graph partitioning improves performance of the PIM accelerator due to reduced off-chip network traffic. (2) How to scale up future PIM systems to have hundreds of vaults?

A significant amount of research on PIM and NDP has generated specialized systems for some applications such as graph processing or neural networks. [1][9][10][11][12][13][19][26]. Ahn et al. [1] propose a scalable PIM accelerator Tesseract for parallel graph processing by utilizing the maximum memory bandwidth, communicating between different memory partitions efficiently, and designing a new programming interface to utilize the new hardware design. Chi et al. [5] propose PRIME, a PIM architecture to speed up neural network (NN) applications using ReRAM main memory. PRIME partitions a ReRAM bank into memory/full function (FF)/buffer subarrays. While memory subarrays are only able to store data, FF subarrays have both storage and computation capabilities to calculate forward propagation. Nai et al. [19] present GraphPIM to offload 18 atomic instructions supported by HMC 2.0 into HMC memory systems for graph computing. The approach of offloading is to define a PIM memory region as uncacheable and map host atomic instructions into this region to bypass the cache system. Gu et al. [11] propose a framework for NDP by filtering out extraneous data transferred between CPUs and storage devices. It allows programmers to write applications in a distributed fashion by providing an abstract data communication between the host and storage. Similar to Y. Xiao et al. [23] and Y. Xue et al. [25], they try to construct dynamic data dependency graphs from input applications but lack a way to differentiate between computations and communications. However, none of these approaches analyze the impact of data partitioning on performance and energy consumption.

Accordingly, there is a need for PIM systems with improved performance and energy consumption properties.

SUMMARY

In at least one aspect, the present invention provides an optimization model to partition data and use higher memory bandwidths of PIM (minimize data movement) while balancing loads across vaults.

In another aspect, a novel PIM-based framework referred to as "Prometheus" is provided. This framework constructs a comprehensive model of computation and communication (MoCC) based on a static and dynamic compilation of an application. Firstly, by adopting a low level virtual machine (LLVM) intermediate representation (IR), an input application is modeled as a two-layered graph consisting of (i) a computation layer in which the nodes denote computation IR instructions and edges denote data dependencies among instructions, and (ii) a communication layer in which the nodes denote memory operations (e.g., load/store) and edges represent memory dependencies detected by alias analysis. Secondly, an optimization framework that partitions the multi-layer network into processing communities within which the computational workload is maximized while balancing the load among computational clusters. Thirdly, a community-to-vault mapping algorithm is proposed for designing a scalable hybrid memory cube (HMC)-based system where vaults are interconnected through a network-on-chip (NoC) approach rather than a crossbar architecture. This ensures scalability to hundreds of vaults in each cube. Experimental results demonstrate that Prometheus consisting of 64 HMC-based vaults improves system performance by 9.8× and achieves 2.3× energy reduction, compared to conventional systems.

In another aspect, the present invention provides an approach to wisely partition data across different vaults in HMC-based systems to exploit high intra-vault memory bandwidth while improving performance and reducing energy consumption. Therefore, the proposed Prometheus framework takes into account the interactions among computations and communication. First, by adopting an LLVM intermediate representation, dynamic trace generation, reduction, code profiling and graph representation, a C/C++ application is described as an interdependent two-layer weighted graph, where nodes denote LLVM IR instructions and edges represent the data and control dependencies among LLVM instructions. Moreover, the weights associated with the edges represent the amount of time required for specific computational processes to wait for one another to complete their work. Consequently, one layer represents a model of computation where nodes denote computation operations such as add and mul while the other layer represents a model of communication where nodes denote memory operations, i.e., load and store. Second, a proposed optimization framework is provided that partitions the two-layer network into highly interacting groups of nodes (clusters) such that the energy consumption required for data movement and accesses is minimized. Third, a community-to-vault mapping strategy is provided which maps each highly interconnected cluster onto a vault while exploiting the NoC communication infrastructure and the high internal memory bandwidth provided by TSVs.

In still another aspect, the present invention addresses the two key challenges required to be addressed to exploit the benefits of PIM systems by adopting a data-center-on-a-chip paradigm [3], the above-mentioned challenges are addressed by (1) formulating the first question as an optimization problem and partitioning the graph to have minimal inter-vault communications; (2) designing a scalable PIM system with NoC to efficiently route packets to the destination vault.

DETAILED DESCRIPTION

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

With respect to the terms "comprising," "consisting of," and "consisting essentially of," where one of these three terms is used herein, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

Abbreviations

"C&D" means community detection.
"HMC" means hybrid memory cube.
"IR" means intermediate representation.
"LLVM" means low level virtual machine.
"NDP" means near-data processing.
"NoC" means network-on-chip.
"PIM" means processing-in-memory.
"TSV" means through-silicon vias.

Figure 1:
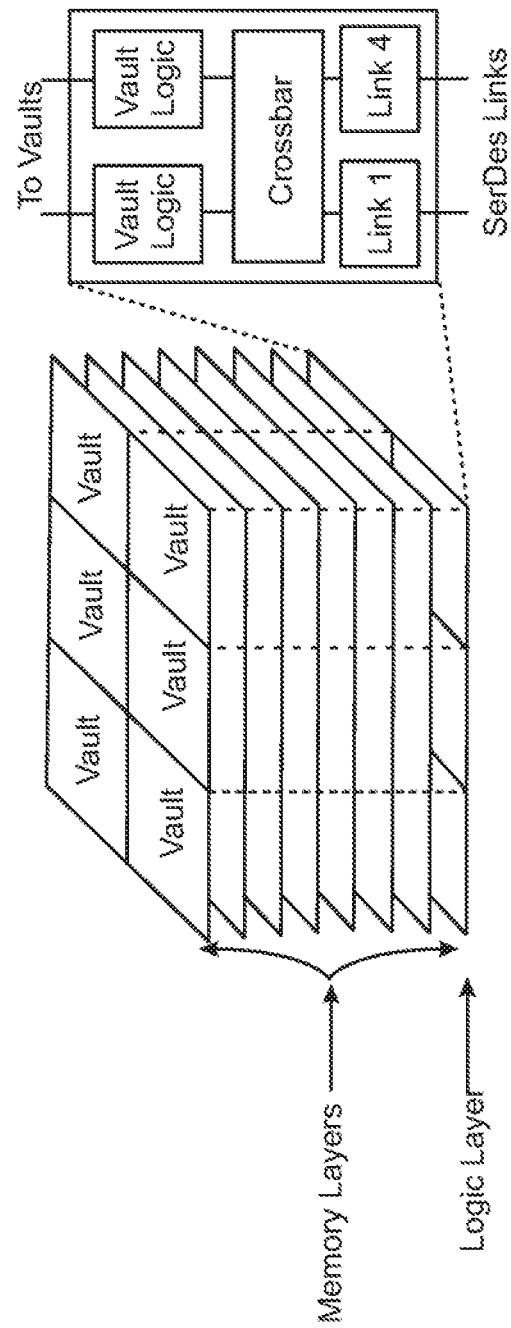
FIG. 1: Schematic of an HMC Architecture.
Figure 2A:
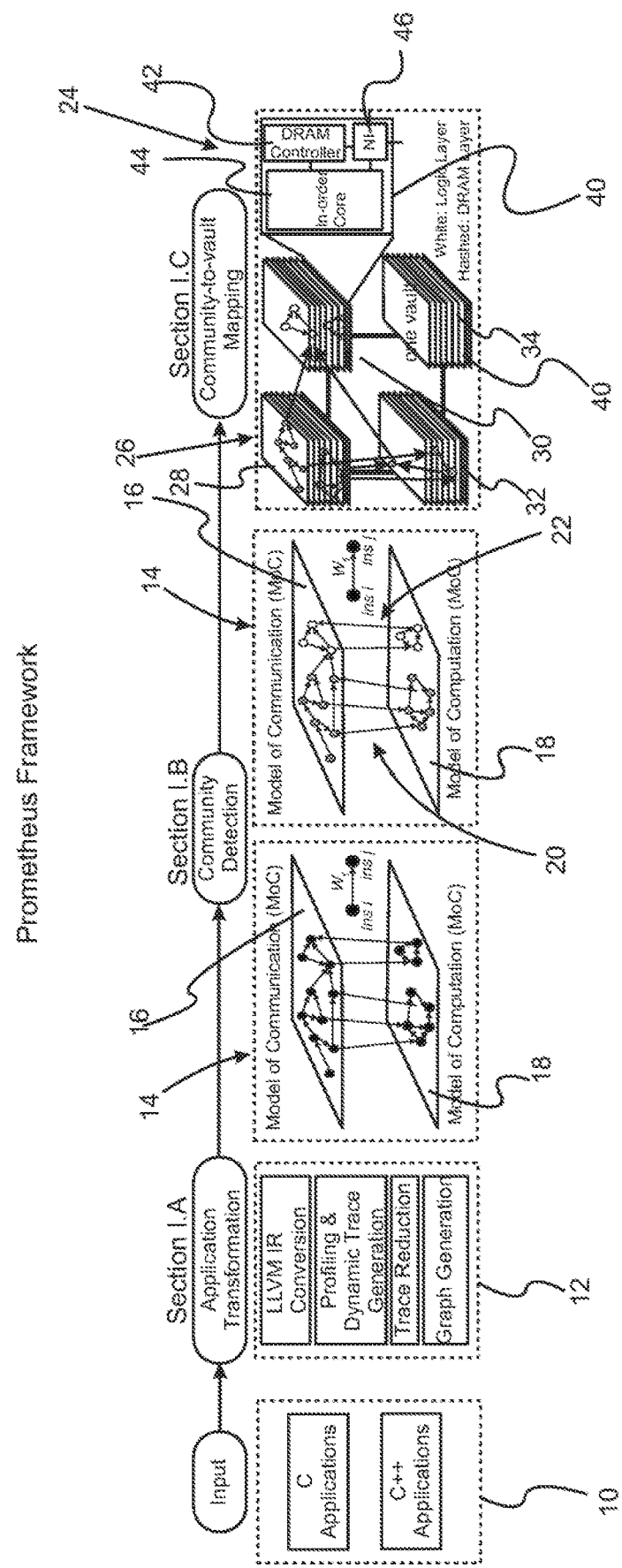
FIG. 2A: Overview of Prometheus framework. Prometheus framework consists of three steps: In step 1, an application is transformed into a two-layered graph, one representing model of communication where nodes denote memory operations, aka, load and store, and the other representing model of computation where nodes denote non-memory operations such as xor and zext. This transformation is performed through code modification, LLVM IR conversion, dynamic trace generation, reduction, profiling, and graph generation. In step 2, an optimization model is provided to better partition the graph into highly connected communities to minimize the energy consumption caused by data access to another community. In step 3, a router is added into the logic layer to form a scalable and efficient NoC substrate and perform community-to-vault mapping.
Figure 2B:
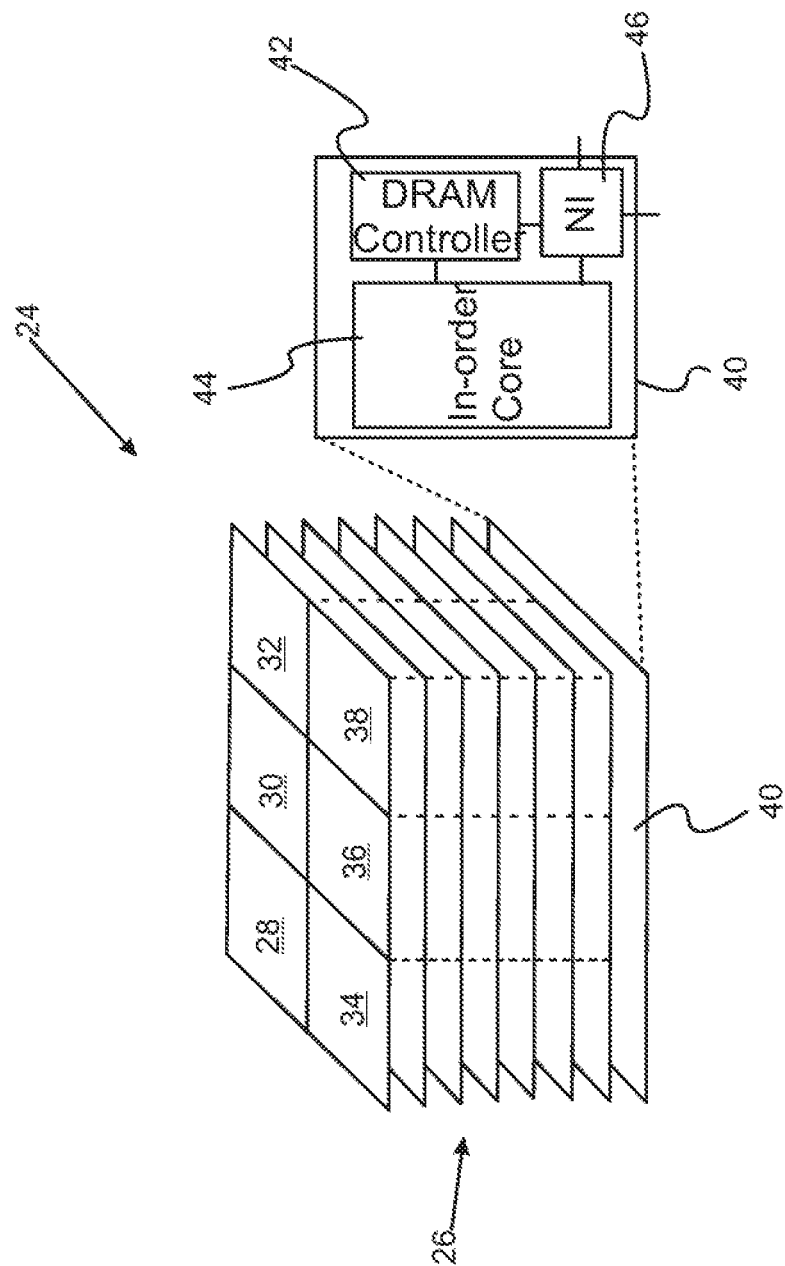
FIG. 2B: Memory device using the Prometheus framework.

In an embodiment, a method for encoding a computer program on a plurality of memory layers that are partitioned into vaults is provided. Typically, the computer program is written in a high-level language such as C or C++. The method includes a step of transforming the computer program 10 into a two-layered graph 14. As depicted in FIGS. 2A and 2B, the two-layered graph 14 includes a communication layer 16 representing a model of communication where nodes denote memory operations and a computation layer 18 representing a model of computation where nodes denote non-memory operations. The two-layered graph 14 is partitioned into connected communities 20, 22 that minimize energy (and/or reduces) consumption caused by data access between communities. In this regard, energy consumption is a least 2 times better (i.e. reduced by a factor of at least 2 e.g., 2-3) compared to currently available PIM systems (e.g., HMCs as of Jan. 1, 2019). For example, NoC traffic is reduced for most applications resulting in an energy consumption for NoC that is reduced by at least a factor of 3 (e.g., 3 to 8) compared to DDR3. For example, NoC traffic can be reduced by at least 50% as compared to OpenMP (e.g., release 4 or 5). In this context, communities include groups of vertices which have higher probability of connection with each other than vertices in other groups. The communities are stored in memory device 24 where each community is mapped to and encoded into plurality of memory layers 26 which define a plurality of vaults 28-38 such that a given community will in its entirety be stored in a single vault (e.g., vaults 28 has a first community encoded therein while 30 has a second community encoded therein) when possible. In a refinement, the plurality of memory layers 26 is a memory stack. A particularly useful example of a device having a plurality of memory layers 26 (e.g., DRAM layers) is a hybrid memory cube (HMC) that includes a logic layer 40. The logic layer can include a memory controller 42, in-order core 34 to perform computations inside memory and optional router 46 with advantageously allows network on a chip routing of packets. In a variation, the memory device can be an HMC of the general structure of FIG. 1.

In one variation, the two-layer graph 14 is constructed by analyzing data and control dependencies to preserve strict program order and functionality. In this regard, the computer program 10 is transformed to its intermediate representation (IR) 12. The computer program is then profiled before and after each memory operations to get an amount of clock cycles (T) and data size (D) such that weights associated to edges in the two-layered graph 14 are a product of T and D. Dependent memory operations are partitioned into the same vault in order to minimize data movement for example by using higher memory bandwidths of PIM which is about 1 TB/s (e.g., the bandwidth can be at least 0.1 TB i.e., 0.1 TB/s to 5 TB/s or more). Dynamic IR traces are collected that are aware of the number of iterations in each loop thereby providing a fine-grained load balancing when traces are partitioned into clusters. Trace reduction is then performed to lower execution overhead by identifying and removing patterns associated with control statements. Edges in the communication layer 16 are detected by alias analysis while edges in the computation layer 18 are determined by data and control dependencies. Communities are determined by partitioning the two-layered graph 14 into interconnected processing communities which are mapped to vaults. Advantageously, a community graph is constructed where nodes represent communities including a series of instructions executed sequentially while edges and their weights represent dependencies and communication cost between communities and encoding concurrent interactions. The community graph is partitioned into communities that balance load (e.g., distribution of workloads across computing resources to optimize resource use, maximize throughput, minimize response time, and avoid overload of any single resource). Communities at the same depth can be executed in parallel. Priorities of communities are ranked by assigning higher priorities to communities at a lower depth. Higher priorities are assigned to communities with higher communication cost if communities are at the same depth. Moreover, communities with higher priorities are encoded in memory locations with faster access times than communities with lower priorities. Finally, the communities are mapped by a router that is part of a logic layer in communication with the plurality of memory layers 26.

In a variation, it should be appreciated that each of the method steps set forth above are performed by a computer processor system that includes a processor, volatile memory (e.g., RAM), and non-volatile memory (e.g., hard drives, DVD, CDROM, optical drives, etc.). Instructions for the methods set forth above can be encoded in the volatile and/or non-volatile memory.

In another embodiment, a memory device encoded is also provided as depicted in FIGS. 2A and 2B. Characteristically, this memory device 24 includes a plurality of memory layers 26 that are partitioned into a plurality of vaults 28-38 and a logic layer 40. Logic layer 40 can include memory controller 42, in-order core 44 to perform computations inside memory and optional router 46 with advantageously allows network on a chip routing of packets. Advantageously, router 46 directs packets to the vaults. Each community of a plurality of communities is encoded into a selected vault from the plurality of vaults 28-38. The plurality of communities being identified by the method set forth above, which in particular includes a step of transforming a computer program into a two-layered graph 14. The two-layered graph 14 includes a communication layer 16 representing a model of communication where nodes denote memory operations and a computation layer 18 representing a model of computation where nodes denote non-memory operations. The two-layered graph 14 is partitioned into connected communities that minimize energy consumption caused by data access between communities, communities including groups of vertices which have higher probability of connection with each other than vertices in other groups. As set forth above, the plurality of memory layers 26 is or is part of a hybrid memory cube that includes a logic layer.

The methods set forth above are also applicable to configuring memory device 20. The two-layer graph 14 is constructed by analyzing data and control dependencies to preserve strict program order and functionality. The computer program 10 is transformed to its intermediate representation (IR) 12. Moreover, the computer program is profiled before and after each memory operations to get an amount of clock cycles (T) and data size (D) such that weights associated to edges in the two-layered graph 14 are a product of T and D. Dependent memory operations are partitioned into the same vault in order to minimize data movement. In a refinement, dynamic IR traces are collected that are aware of the number of iterations in each loop thereby providing a fine-grained load balancing when traces are partitioned into clusters. In a further refinement, trace reduction is performed to lower execution overhead by identifying and removing patterns associated with control statements. Also, as set forth above, edges in the communication layer 16 are detected by alias analysis while edges in the computation layer 18 are determined by data and control dependencies. Communities are determined by partitioning the two-layered graph into interconnected processing communities which are mapped to vaults. A community graph is constructed where nodes represent communities including a series of instructions executed sequentially while edges and their weights represent dependencies and communication cost between communities and encoding concurrent interactions. In a refinement, the community graph is partitioned into communities that balance load. Advantageously, communities at the same depth can be executed in parallel. In a refinement, priorities of communities are ranked by assigning higher priorities to communities at a lower depth such that higher priorities are assigned to communities with higher communication cost if communities are at the same depth. In another refinement, communities with higher priorities are encoded in memory locations with faster access times than communities with lower priorities. In this regard, communities are mapped by a router 36 that is part of a logic layer 30 in communication with the plurality of memory layers 26.

Additional details of the Prometheus framework are set forth in Y. Xiao, S. Nazarian and P. Bogdan, "Prometheus: Processing-in-memory heterogeneous architecture design from a multi-layer network theoretic strategy," 2018 *Design, Automation & Test in Europe Conference & Exhibition* (*DATE*), Dresden, 2018, pp. 1387-1392. doi: 10.23919/DATE.2018.8342229; the entire disclosure of which is hereby incorporated by reference.

The following examples illustrate the various embodiments of the present invention. Those skilled in the art will recognize many variations that are within the spirit of the present invention and scope of the claims.

I. THE PROMETHEUS FRAMEWORK

In this section, as shown in FIG. 2A, the Prometheus framework includes three steps: (A) Application Transformation; (B) Community Detection; and (C) Community-to-vault Mapping.

A. Application Transformation

Figure 3:
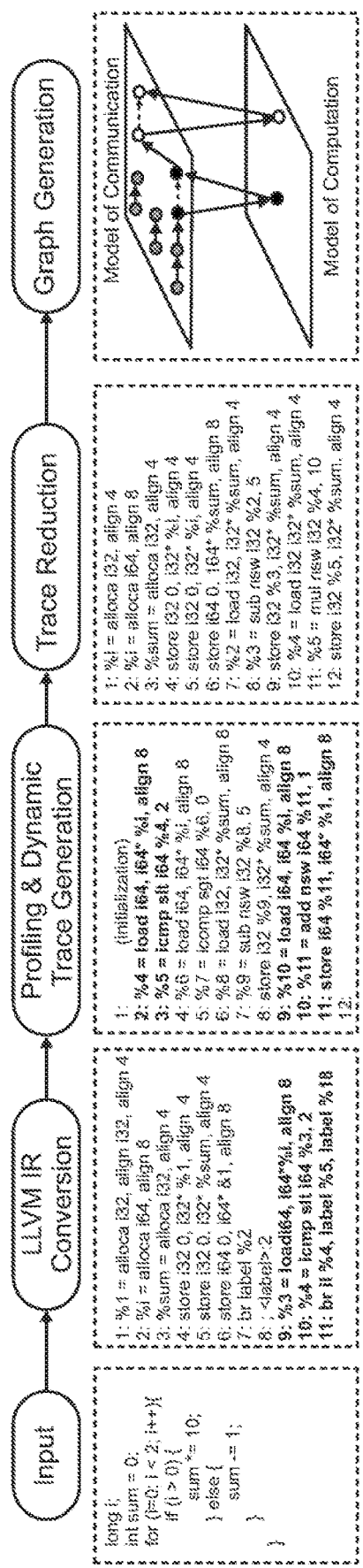
FIG. 3: Overview of application transformation. First, a C program is converted to LLVM IR instructions. Second, the instructions are profiled and executed in order to collect dynamic traces including computations, the amount of time and data size for CPUs to finish each memory operation. Third, control IR statements are removed by identifying a series of patterns. Fourth, data and control dependencies are analyzed between instructions and construct a two-layered graph. Black dotted lines represent memory dependencies detected by alias analysis.

FIG. 3 shows a high-level logic diagram on how an input C/C++ application is transformed into a two-layer network. First, each input C/C++ application is converted to LLVM IR instructions. One then modifies and uses Contech [21] to collect dynamic traces of the application and latency for memory operations. Next, all IR instructions corresponding to control statements in C such as if-else, for, and while are removed. Finally, a two-layer network is automatically constructed by analyzing data and control dependencies to preserve strict program order and functionality.

1) LLVM IR Conversion:

Each C/C++ application is transformed to its corresponding LLVM IR instructions using the Clang compiler: Clang -emit-llvm -S.

2) Profiling:

The program is profiled by instrumenting the lightweight function rdtsc( ) and some inline code before and after each memory operations to get the amount of clock cycles (T) and data size (D). The weights associated with edges in the two-layered network is the product of T and D. The rationale for considering this weighted two-layer network representation is motivated by the goal to partition dependent memory operations into the same vault in order to minimize data movement. This profiling is architecture independent but results can indicate the underlying memory hierarchy: The larger the T and D are, the further away is the data from cores (possibly in LLC or main memory) as data in memory have to be fetched via off-chip links, which is time-consuming. Therefore, data storage and memory hierarchy is encoded into weights used in the graph.

3) Dynamic Trace Generation & Trace Reduction:

Contech is used to collect dynamic IR traces. Like full loop unrolling, dynamic traces are aware of how many iterations loops have, leading to fine-grained load balancing when traces are partitioned into clusters. Furthermore, due to the nature of dynamic traces, one is aware of the execution flow of the application and there is no need to store IR instruction corresponding to control statements in C such as if-else, for, and while. Therefore, trace reduction is performed to lower execution overhead by identifying some patterns associated with control statements and removing them. For example, if statements have the following structure: the type of the first instruction is load and the second instruction dependent on the first one is icmp. As long as such pattern is found in a basic block consisting only of two instructions, this basic block is removed. As illustrated in FIG. 3, lines 2 and 3 in the third file correspond to the for statement. It is checked whether this basic block has only two instructions in which one represents load while the other denotes icmp that depends on the first load instruction. If all requirements are satisfied, lines 2 and 3 are removed as indicated in the fourth file without bolded texts.

4) Graph Generation:

Communications, computations, and their interconnected dependencies are encoded by constructing two-layered graphs where one layer represents the model of communication, and the other one denotes the model of computation. Nodes in one layer denote computations whereas nodes in the other layer denote communications. Edges in the communication layer are detected by alias analysis (In LLVM, alias analysis is performed using -basicaa -aa-eval—print-all-alias-modref-info) whereas the rest of edges are analyzed by data and control dependencies. A formal description of the two-layer network representation of an application is provided in section I.B (see definition 1). As shown in FIG. 3, except lines 8 and 11, which are computation nodes, the rest are nodes in the space of the communication layer. Dependencies are analyzed in two phases: During the first phase, data and control dependencies among instructions are analyzed, which corresponds to non-dotted edges in FIG. 3. During the second phase, alias analysis is performed to connect different subcomponents in the communication layer into one graph. Black dotted edges in FIG. 3 demonstrate this connection.

B. Identification of Processing Communities

Community detection in networks is a technique to find groups of vertices which have higher probability of connection with each other than vertices in other groups [24]. Therefore, the community detection idea is adopted and the two-layered graph is partitioned into interconnected processing communities which are next mapped to vaults. Thus, a community graph is built, which is similar to task graph, where nodes represent communities including a series of instructions executed sequentially while edges and their weights represent dependencies and communication cost between communities and encoding concurrent interactions. Therefore, the goal of this section is to formulate a mathematical optimization model and partition the graph into communities while balancing the load among communities.

Before formulating the optimization model, two formal definitions are introduced for input and output graphs:

Definition 1:

A two-layered graph TG is a weighted directed graph $G_1 = TG(n_i, l_i, e_{ij}, w_{ij} | i,j \in \{1, \ldots, N\}; l_i \in \{1,2\})$ where nodes $n_i$ in the layer $l_i$ (1 or 2) represent memory or non-memory instructions; edges $e_{ij}$ represent dependencies found by alias analysis in the memory layer ($l_i=1$) and data/control dependencies; edge weights $w_{ij}$ represent latency times data size for memory instructions.

Definition 2:

A community graph CG is a weighted directed graph $G_2 = CG(V_i, d_i, E_{ij}, W_{ij} | i,j \in \{1, \ldots, N\})$ where nodes $V_i$ represent a series of IR instructions to be executed in sequential, which are called communities; edges $E_{ij}$ represent dependencies between communities; edge weights $W_{ij}$ represent communication cost from one node i to another j. Depth $d_i$ represents the largest number of hops node i takes to the root which is considered as a starting point (Note that the depth of node 5 should be 3 rather than 2 because the longest path is {1, 2, 5, 8, 9}. The depth can be found using levelization).

Based on these definitions, the following optimization problem is formulated: Given a two-layered graph TG, find communities which maximize the following function $$\max_{C_i C_j} F = Q - R \quad (1)$$

$$Q = \frac{1}{2W} \sum_{ij} \left[ W_{ij} - \frac{s_i s_j}{2W} \right] \delta(C_i, C_j) \quad (2)$$

$$R = \frac{\alpha}{2W} \sum_{\substack{1 \leq u \leq n_c \\ 1 \leq v \leq n_c \\ u \neq v}} |W_u - W_v| \delta(d_u, d_v) \quad (3)$$

where W is the sum of the total weights in TG; $W_i$ is the sum of weights in the community i; $W_{ij}$ is the weight between nodes i and j; $s_i$, the strength of a node i, is the sum of the weights of edges adjacent to the node i; $C_i$ is the community to which node i belongs; $n_c$ is the number of communities; $d_i$ is the depth of community i; $\delta(i, j)$ equals 1 when i=j; $\alpha$ controls the importance of load bearing.

The function Q measures the difference between the sum of weights within a community $W_{in} = \Sigma_{ij} W_{ij} \delta(C_i, C_j)$ and that adjacent to the community $$W_{adj} = \sum_{ij} \frac{s_i s_j}{2W} \delta(C_i, C_m).$$

Figure 4:
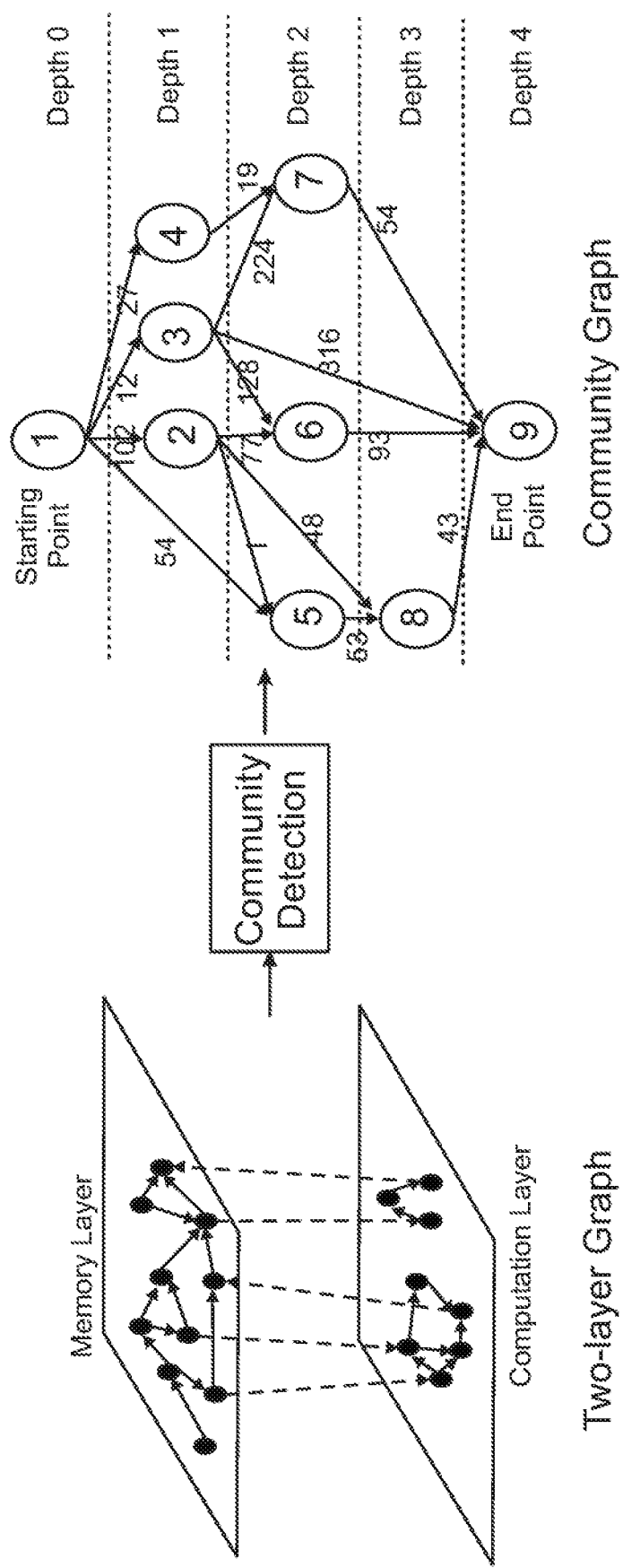
FIG. 4: Building on the two-layered graph generated in Section A, the graph is partitioned into interdependent communities representing a set of IR instructions to be executed in sequential.

By maximizing F, Q should also be maximum. Therefore, $W_{in}$, which represents workload in a community, increases and $W_{adj}$, representing communication cost decreases. Therefore, data movement is confined almost within each community. The function R quantifies the load balancing at any depth. As shown in FIG. 4, communities at the same depth can be executed in parallel. Therefore, one needs to make sure the loads in those communities should be balanced to reduce the overhead of core idle waiting. $W_u$ computes the load in the community u and $\delta(d_u, d_v)$ ensures that communities u and v are at the same depth. Hence, in order to maximize F, R should be minimized, enforcing $W_u$ and W to be nearly equalized at the same depth ($\delta(d_u, d_v)=1$).

C. Community-to-Vault Mapping

In this section, based on the community graph, the aim is to build a scalable PIM system and map communities to vaults.

1) Scalable PIM System:

Some memory-intensive applications require more memories to store huge amount of data. Therefore, in order to increase memory capacity in PIM systems, more HMCs are utilized and connected via highspeed Serializer/Deserializer (SerDes) links to provide high memory bandwidth. However, SerDes links consume almost half of HMC's power [1][19][20]. In order to save energy wasted on SerDes links, a scalable PIM system with NoC in the logic layer is proposed to efficiently route packets to the destination vault instead of the crossbar used in HMC as shown in FIG. 2. Therefore, in order to have more memories, extra vaults are simply added with routers to this design instead of connecting it to HMCs via SerDes links.

Figure 5:
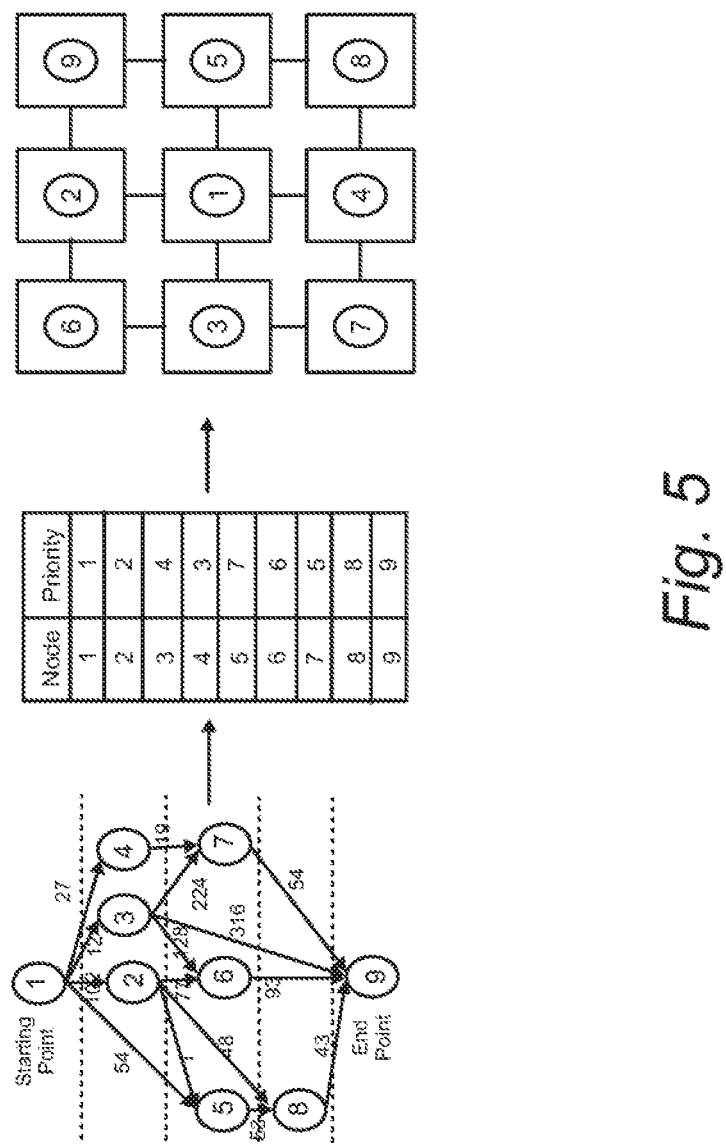
FIG. 5: Community-to-vault mapping.

2) Mapping:

Algorithm 1 is proposed to map communities detected in Section B to available vaults in the scalable PIM system. First, the priorities of communities are ranked by first assigning higher priorities to communities at the lower depth. For example, in FIG. 5, the starting community in the depth 0 gets the highest priority. If communities are at the same depth, assign higher priorities to one with the higher communication cost. For example, communication costs for communities 3, 4, and 5 at the depth 1 are 102, 12, 27 respectively, then the priority order in this depth should be 3>5>4. After priority assignment, communities are mapped onto NoC in a greedy way as more important communities (with higher priorities) should take up the better location, which is the center of the chip as shown in FIG. 5.

II. EVALUATION

A. System Configuration

1) DDR3: 64 in-order cores is used to model a DDR3-based system. Each core has a 64 KB L1 private cache and a 256 KB distributed L2 shared cache as shown in Table 1, with a memory controller to connect to memory subsystem, i.e., DDR3. This system is the baseline for the evaluation.

2) HMC: Table 1 shows configuration parameters of the evaluated scalable HMC-based system, which includes 64 vaults with eight memory layers and one logic layer. In the logic layer, one vault consists of the same cores used in the DDR3-based system and NoC to connect them. To further evaluate different data partitioning schemes, METIS [16] is applied, a multi-way graph partitioning, and the proposed community detection (CD) into clusters to be mapped onto different vaults in the system.

---

Algorithm 1 Community-to-vault Mapping Algorithm

Input: The community graph (CG)
Output: A set of tuples T indicating which community maps
        to which vault
1:  /* Priority Assignment */
2:  PriorityQueue = ( )
3:  for nodes in each depth do
4:      Sort nodes by comm costs in the descending order
5:      PriorityQueue.append(nodes)
6:  end for
7:  /* Community-to-vault Mapping */
8:  Mapping = ( )
9:  for node ∈ PriorityQueue do
10:     if node is the starting point then
11:         place = the center of the mesh-based NoC
12:     else
13:         place = closest to the parent node it depends (Greedy)
14:     end if
15:     Mapping.append((node, place))
16: end for

---

TABLE I

Configuration parameters

| | | |
|---|---|---|
| Processor | Cores | In-order, 16 MSHRs |
| | L1 private cache | 64 KB, 4-way associative 32-byte blocks |
| | L2 shared cache | 256 KB, distributed |
| Memory Layer | Configuration | 16 GB cube, 64 vaults16 8 DRAM layers |
| | Internal Bandwidth | 16 GB/s per vault |
| | DRAM Timing | DDR3-1600 |

TABLE I-continued

| | Configuration parameters | |
|---|---|---|
| Network | Scheduling Policy | FR-FCFS |
| | Topology | Mesh |
| | Routing Algorithm | XY routing |
| | Flow Control | Virtual channel flit-based |

B. Simulation Configuration

Contech [21] is used as the frontend functional simulator to generate dynamic LLVM traces from C/C++ applications, write a compiler-based parser to construct a two-layered graph and perform community detection to partition the graph into clusters. 3D-stacked memory layers that follow the 2.1 specification [6] is modelled using ASMSim [22] and NoC communication substrate using Booksim2 [15] as backend timing simulators. Both simulators are cycle-accurate and trace-based. (Booksim2 supports Netrace traces as simulation input.) Table 2 lists the 7 benchmarks used to validate the system.

TABLE II

Benchmarks and descriptions

| Benchmark | Description | Source |
|---|---|---|
| BS | Calculate European options | PARSEC[2] |
| SC | Solve the online clustering problem | PARSEC[2] |
| BP | Back-propagation | Rodinia[4] |
| KM | K-means | Rodinia[4] |
| MD | Simulate molecular dynamics | OmpSCR[7] |
| FFT | Compute Fast Fourier Transform | OmpSCR[7] |
| MDB | Calculate Mandelbrot Set | OmpSCR[7] |

For energy evaluation, the energy consumption of caches in cores is modelled using CACTI 6.0 [18] and compute the energy of memory layer access, which is 3.7 pJ/bit [20] assuming memory operations dominate. Next, following [14], the derived total energy consumption of a transaction from node i to node j is described as follows: $E_{ij} = N(n_{hops}E_{router} + (n_{hops}-1)E_{flit})$ where N, $n_{hops}$, $E_{router}$, and $E_{flit}$ represent the number of bits to be transferred, the number of hops, energy consumption of routers and flit transfer respectively. It is assumed that interconnect consumes 2 pJ/bit for flit transfer $E_{flit}$ and 1.5 pJ/bit for routers to process flits $E_{router}$ [17].

C. Experimental Results

Figure 6:
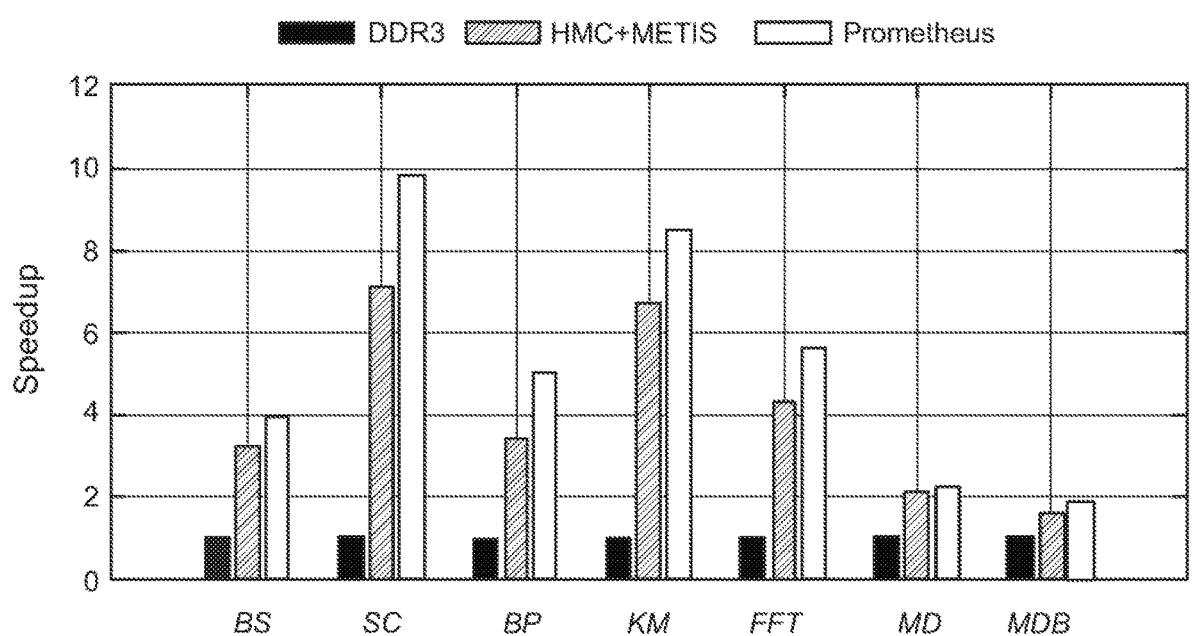
FIG. 6: Speedup comparison.

1) Performance:

FIG. 6 compares the speedup between DDR3 and HMC-based systems. The embarrassingly parallel application (i.e. MDB) and applications such as MD and BS may not benefit too much from PIM due to low off-chip memory bandwidth usage compared to what PIM could provide. Therefore, speedup improves only at most 4× compared to the DDR3-based system. However, if applications such as SC require high off-chip memory bandwidth, then compared to DDR3-based systems which could only provide no more than 100 GB/s, the proposed HMC-based system could provide 1 TB/s. Distinction is more pronounced if the number of vaults per cube is increased. Therefore, the speedup improvement for SC is 9.8× as high as DDR3-based systems.

In HMC, METIS and CD are adopted to partition the graph into interconnected clusters. However, for embarrassingly parallel programs, the graph representation cannot guarantee that clusters after graph partitioning are independent to each other. Therefore, the performance improvement of applications such as MD and MDB is at most 1× compared to DDR3-based systems where it is easy to parallelize using threads. Nevertheless, the graph partitioning scheme outperforms METIS because this scheme tries to minimize communication while balancing the load.

Figure 7:
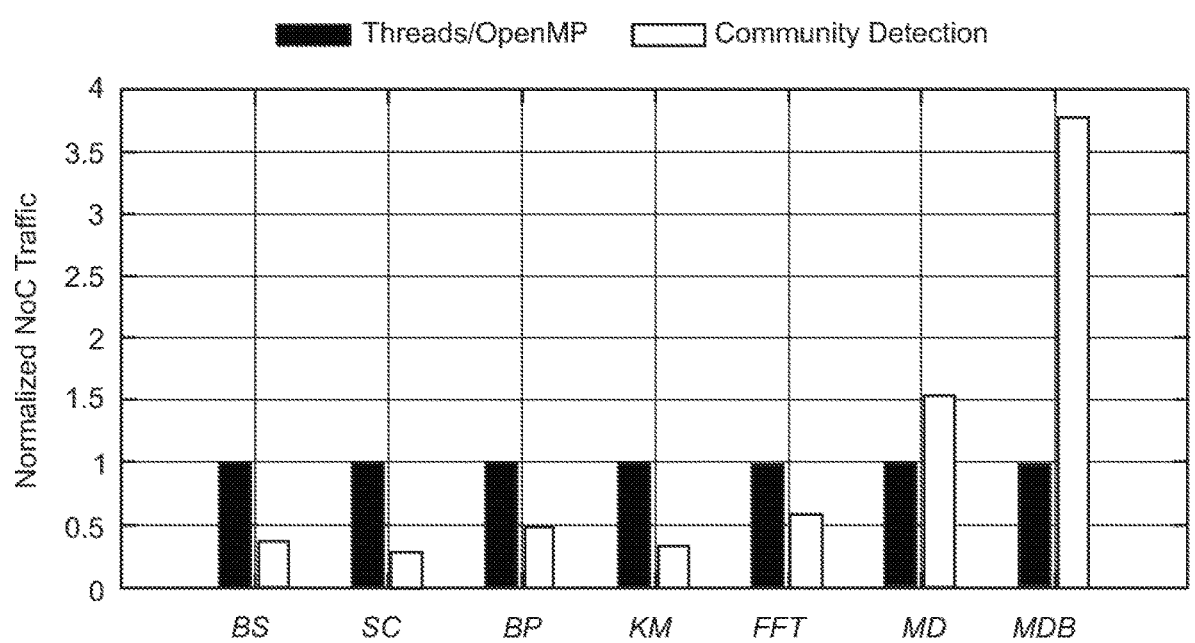
FIG. 7: NoC traffic with different parallelism approaches.

2) NoC Traffic:

FIG. 7 illustrates the normalized NoC traffic with respect to threads/OpenMP and the proposed graph partitioning. For applications such as MD and MDB, there are few data dependencies among threads while clusters are interconnected in the graph representation. Therefore, NoC traffic for those applications degrades somewhat compared to threads running almost independent on cores. However, for most non-embarrassingly parallel applications, community detection tries its best to confine data movement within a cluster, leading to lower energy.

Figure 8:
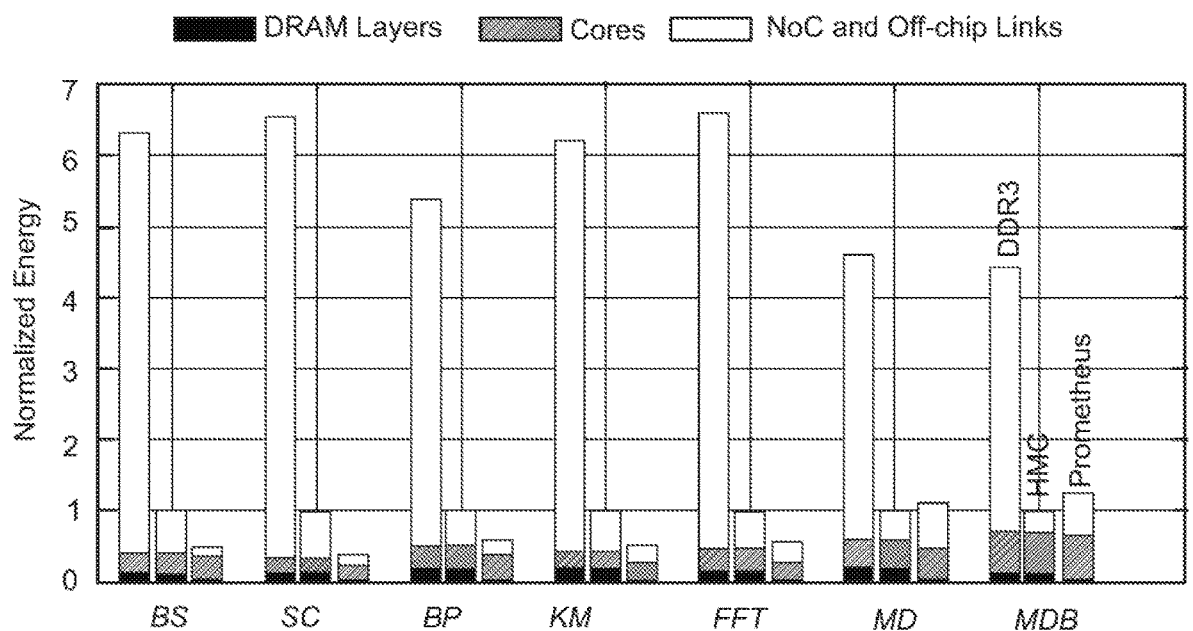
FIG. 8: The comparison of normalized energy consumption.

3) Energy Consumption:

FIG. 8 shows the comparison of normalized energy consumption among DDR3, HMC, and Prometheus systems. Computations should remain the same (hashed bar in FIG. 8) for all systems, while HMC improves energy consumption regarding off-chip links compared to DDR3 as HMC has higher off-chip memory bandwidth and shorter distance between cores and memory, causing shorter execution time. Prometheus further improves energy consumption compared to HMC as community detection is applied to partition the graph into clusters to minimize data communications between vaults. In other words, NoC traffic is reduced for most applications except MD and MDB, thus energy consumption for NoC (white bar in FIG. 8) improves a lot.

III. CONCLUSION

Embodiments set forth above describe Prometheus, an optimization framework to find the best data partitioning scheme for PIM systems to improve the performance and energy consumption. Prometheus exploits the high memory bandwidth (~1 TB/s) of PIM systems by (1) representing each application as a two-layered graph where in the computation layer, nodes denote computation instructions and edges denote data dependencies; in the communication layer, nodes denote load/store instructions and edges are formed by alias analysis. (2) performing community detection to find interconnected clusters ensuring that data movement is almost confined within each cluster and workloads among clusters are balanced. (3) designing a scalable PIM system where vaults are connected via NoC rather than crossbar and mapping clusters to vaults in a greedy fashion. Evaluation with 64 vaults and one in-order core per vault demonstrates that performance improvement is 9.8× and 1.38× as high as traditional DDR3-based systems and PIM systems with METIS graph partitioning respectively. Energy consumption improvement is 2.3×, compared to PIM system without community detection as Prometheus tries to reduce NoC traffic between different vaults.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

REFERENCES

[1] J. Ahn et al. "A scalable processing-in-memory accelerator for parallel graph processing". In: *ISCA*. 2015.

[2] C. Bienia et al. "The PARSEC benchmark suite: Characterization and architectural implications". In: *PACT*. 2008.
[3] P. Bogdan. "Mathematical modeling and control of multifractal workloads for data-center-on-a-chip optimization". In: *NOCS*. 2015.
[4] S. Che et al. "Rodinia: A benchmark suite for heterogeneous computing". In: *IISWC*. 2009.
[5] P. Chi et al. "Prime: A novel processing-in-memory architecture for neural network computation in reram-based main memory". In: *ISCA*. 2016.
[6] Hybrid Memory Cube Consortium. "Hybrid memory cube specification 2.1". In: 2013.
[7] A. J. Dorta et al. "The OpenMP source code repository". In: *PDP*. 2005.
[8] J. Draper et al. "The architecture of the DIVA processing-in-memory chip". In: *ICS*. 2002.
[9] M. Gao et al. "Practical near-data processing for in-memory analytics frameworks". In: *PACT*. 2015.
[10] M. Gao and C. Kozyrakis. "HRL: efficient and flexible reconfigurable logic for near-data processing". In: *HPCA*. 2016.
[11] B. Gu et al. "Biscuit: A framework for near-data processing of big data workloads". In: *ISCA*. 2016.
[12] K. Hsieh et al. "Accelerating pointer chasing in 3D-stacked memory: Challenges, mechanisms, evaluation". In: *ICCD*. 2016.
[13] K. Hsieh et al. "Transparent offloading and mapping (TOM): Enabling programmer-transparent near-data processing in GPU systems". In: *ISCA*. 2016.
[14] J. Hu and R. Marculescu. "Energy- and performance-aware mapping for regular NoC architectures". In: *IEEE TCAD*. 2005.
[15] N. Jiang et al. "A detailed and flexible cycle-accurate network-on-chip simulator". In: *ISPASS*. 2013.
[16] G. Karypis and V. Kumar. "A fast and high quality multilevel scheme for partitioning irregular graphs". In: *SISC* (1998).
[17] G. Kim et al. "Memory-centric system interconnect design with hybrid memory cubes". In: *PACT*. 2013.
[18] N. Muralimanohar et al. "CACTI 6.0: A tool to model large caches". In: *HP Laboratories*. 2009.
[19] L. Nai et al. "GraphPIM: Enabling Instruction-Level PIM Offloading in Graph Computing Frameworks". In: *HPCA*. 2017.
[20] S. H. Pugsley et al. "NDC: Analyzing the impact of 3D-stacked memory+logic devices on MapReduce workloads". In: *ISPASS*. 2014.
[21] B. P. Railing et al. "Contech: Efficiently generating dynamic task graphs for arbitrary parallel programs". In: *TACO*. 2015.
[22] L. Subramanian et al. "The application slowdown model: Quantifying and controlling the impact of inter-application interference at shared caches and main memory". In: *MICRO*. 2015.
[23] Y. Xiao et al. "A Load Balancing Inspired Optimization Framework for Exascale Multicore Systems: A Complex Networks Approach". In: *ICCAD*. 2017.
[24] Y. Xue and P. Bogdan. "Reliable Multi-Fractal Characterization of Weighted Complex Networks: Algorithms and Implications". In: *Scientific Reports* (2017).
[25] Y. Xue and P. Bogdan. "Scalable and realistic benchmark synthesis for efficient NoC performance evaluation: A complex network analysis approach". In: *CODES+ISSS*. 2016.
[26] D. Zhang et al. "TOP-PIM: throughput-oriented programmable processing in memory". In: *HPDC*. 2014.

What is claimed is:

1. A method for encoding a computer program on a plurality of memory layers that are partitioned into vaults, the method comprising:
   a) transforming the computer program into a two-layered graph, the two-layered graph including a communication layer representing a model of communication where nodes denote memory operations and a computation layer representing a model of computation where nodes denote non-memory operations;
   b) partitioning the two-layered graph into connected communities that minimize energy consumption caused by data access between communities, communities including groups of vertices which have higher probability of connection with each other than vertices in other groups; and
   c) mapping and encoding each community into a vault.

2. The method of claim 1 wherein the plurality of memory layers is a memory stack.

3. The method of claim 1 wherein the plurality of memory layers is a hybrid memory cube that includes a logic layer.

4. The method of claim 3 wherein the logic layer includes a router thereby allowing network on a chip routing of packets.

5. The method of claim 1 wherein the two-layer graph is constructed by analyzing data and control dependencies to preserve strict program order and functionality.

6. The method of claim 5 wherein the computer program is transformed to its intermediate representation (IR).

7. The method of claim 6 wherein the computer program is profiled before and after each memory operations to get an amount of clock cycles (T) and data size (D) such that weights associated to edges in the two-layered graph are a product of T and D.

8. The method of claim 7 wherein dependent memory operations are partitioned into the same vault in order to minimize data movement.

9. The method of claim 8 wherein dynamic IR traces are collected that are aware of the number of iterations in each loop thereby providing a fine-grained load balancing when traces are partitioned into clusters.

10. The method of claim 9 wherein trace reduction is performed to lower execution overhead by identifying and removing patterns associated with control statements.

11. The method of claim 1 wherein edges in the communication layer are detected by alias analysis while edges in the computation layer are determined by data and control dependencies.

12. The method of claim 1 wherein communities are determined by partitioning the two-layered graph into inter-connected processing communities which are mapped to vaults.

13. The method of claim 12 wherein a community graph is constructed where nodes represent communities including a series of instructions executed sequentially while edges and their weights represent dependencies and communication cost between communities and encoding concurrent interactions.

14. The method of claim 13 wherein the community graph is partitioned into communities that balance load.

15. The method of claim 14 wherein communities at the same depth can be executed in parallel.

16. The method of claim 14 wherein priorities of communities are ranked by assigning higher priorities to communities at a lower depth.

17. The method of claim 16 wherein higher priorities are assigned to communities with higher communication cost if communities are at the same depth.

18. The method of claim 17 wherein communities with higher priorities are encoded in memory locations with faster access times than communities with lower priorities.

19. The method of claim 18 wherein the communities are mapped by a router that is part of a logic layer in communication with the plurality of memory layers.

20. The method of claim 1 wherein each of steps a), b), and c) are executed by a computer processor.

21. A memory device comprising:
a plurality of memory layers that are partitioned into a plurality of vaults;
a logic layer that includes a router for directing packets to the vaults, each community of a plurality of communities is encoded into a selected vault from the plurality of vaults, the plurality of communities being identified by:
a) transforming a computer program into a two-layered graph, the two-layered graph including a communication layer representing a model of communication where nodes denote memory operations and a computation layer representing a model of computation where nodes denote non-memory operations; and
b) partitioning the two-layered graph into connected communities that minimize energy consumption caused by data access between communities, communities including groups of vertices which have higher probability of connection with each other than vertices in other groups.

22. The memory device of claim 21 wherein the plurality of memory layers is a hybrid memory cube that includes a logic layer.

23. The memory device of claim 21 wherein the two-layer graph is constructed by analyzing data and control dependencies to preserve strict program order and functionality.

24. The memory device of claim 23 wherein the computer program is transformed to its intermediate representation (IR).

25. The memory device of claim 24 wherein the computer program is profiled before and after each memory operations to get an amount of clock cycles (T) and data size (D) such that weights associated to edges in the two-layered graph are a product of T and D.

26. The memory device of claim 25 wherein dependent memory operations are partitioned into the same vault in order to minimize data movement.

27. The memory device of claim 26 wherein dynamic IR traces are collected that are aware of the number of iterations in each loop thereby providing a fine-grained load balancing when traces are partitioned into clusters.

28. The memory device of claim 27 wherein trace reduction is performed to lower execution overhead by identifying and removing patterns associated with control statements.

29. The memory device of claim 27 wherein edges in the communication layer are detected by alias analysis while edges in the computation layer are determined by data and control dependencies.

30. The memory device of claim 27 wherein communities are determined by partitioning the two-layered graph into interconnected processing communities which are mapped to vaults.

31. The memory device of claim 30 wherein a community graph is constructed where nodes represent communities including a series of instructions executed sequentially while edges and their weights represent dependencies and communication cost between communities and encoding concurrent interactions.

32. The memory device of claim 31 wherein the community graph is partitioned into communities that balance load.

33. The memory device of claim 32 wherein communities at the same depth can be executed in parallel.

34. The memory device of claim 31 wherein priorities of communities are ranked by assigning higher priorities to communities at a lower depth.

35. The memory device of claim 34 wherein higher priorities are assigned to communities with higher communication cost if communities are at the same depth.

36. The memory device of claim 35 wherein communities with higher priorities are encoded in memory locations with faster access times than communities with lower priorities.

37. The memory device of claim 36 wherein the communities are mapped by a router that is part of a logic layer in communication with the plurality of memory layers.

* * * * *